United States Patent

Adamson et al.

[11] Patent Number: 5,519,748
[45] Date of Patent: May 21, 1996

[54] ZIRCALOY TUBING HAVING HIGH RESISTANCE TO CRACK PROPAGATION

[75] Inventors: Ronald B. Adamson, Fremont; Gerald A. Potts, San Jose, both of Calif.

[73] Assignee: General Electric Company, San Jose, Calif.

[21] Appl. No.: 52,793

[22] Filed: Apr. 23, 1993

[51] Int. Cl.⁶ ..................................................... G21C 3/07
[52] U.S. Cl. ........................ 376/457; 376/900; 148/519; 148/672; 428/548
[58] Field of Search ................................ 376/414, 416, 376/417, 457, 900; 148/421, 519, 520, 672; 428/548; 420/422

[56] References Cited

U.S. PATENT DOCUMENTS

| | | | |
|---|---|---|---|
| 4,576,654 | 3/1986 | Eddens et al. | 148/520 |
| 4,718,949 | 1/1988 | Takase et al. | 376/457 |
| 4,894,203 | 1/1990 | Adamson | 376/416 |
| 4,938,920 | 7/1990 | Garzarolli et al. | 376/457 |

FOREIGN PATENT DOCUMENTS

| | | |
|---|---|---|
| 425465 | 5/1991 | European Pat. Off. . |
| WO92/08818 | 5/1992 | WIPO . |

*Primary Examiner*—Daniel D. Wasil
*Attorney, Agent, or Firm*—James E. McGinness; Jeffrey K. Weaver

[57] ABSTRACT

A Zircaloy cladding having an outer region comprising fine precipitates and inner region comprising coarse precipitates is provided. The outer region comprises about 10% and the inner region comprises about 90% of the cladding wall thickness. Such Zircaloy tubing is resistant to propagation of cracks and at the same time resistant to corrosion in boiling water reactors (BWR). Resistance to damage caused by the pellet-cladding-interaction can be achieved by standard application of a zirconium or zirconium-alloy liner on the tubing inside surface.

76 Claims, 5 Drawing Sheets

ZIRCALOY TUBING HAVING HIGH RESISTANCE TO CRACK PROPAGATION

This invention relates to Zircaloy cladding for use in nuclear fuel elements. More particularly, the invention relates to cladding having improved axial crack propagation resistance.

BACKGROUND OF THE INVENTION

Nuclear reactors have their fuel contained in sealed cladding for the isolation of the nuclear fuel from the moderator/coolant system. The term cladding, as used herein, refers to a zirconium based alloy tube composed of at least one metal in addition to the zirconium base. The term precipitates, as used herein, refers to added metals of the cladding and forming isolated structures in a matrix throughout the zirconium alloy. These precipitates may or may not constitute intermetallics. Typically, these precipitates are uniformly distributed in the matrix—although they vary in size. Further, so-called fine precipitates (below 0.1 microns), can either be in the matrix format or the so-called two dimensional format where the precipitates occupy sheet like layer near the outer surface of the zirconium alloy.

The cladding—nominally in the order of 0.030 inches thick—is formed in the shape of a tube with the nuclear fuel contained typically in pellet form therein. These pellets are stacked in contact with one another for almost the entire length of each cladding tube, which cladding tube is in the order of 160 inches in length. Typically, the cladding tube is provided with springs for centering the fuel pellets and so-called "getters" for absorbing fission gases. Thereafter, the internal portions of the fuel rod are pressurized with various gases for optimum dissipation of gases produced from the fission reaction, and sealed at both ends.

Zirconium and its alloys, under normal circumstances, are excellent nuclear fuel cladding since they have low neutron absorption cross sections and at temperatures below about 398° C. (at or below the core temperature of the operating reactor) are strong, ductile, extremely stable and nonreactive in the presence of demineralized water or steam. "Zircaloys" are a widely used family of corrosion-resistant zirconium alloy cladding materials. The Zircaloys are composed of 98–99% by weight zirconium, with the balance being tin, iron, chromium, and nickel. "Zircaloy-2" and "Zircaloy-4" are two widely-used zirconium-based alloys for cladding. (Zircaloy-4 omitting nickel).

Cladding corrosion is a potential problem both in boiling water reactors and pressurized water reactors. For example, in a PWR, water does not boil—although in modern designs minute boil can occur at the top of some fuel rods. The oxygen level is relatively suppressed, being about 20 ppb. Hydrogen is injected and resident in the water moderator at about 200 ppb and utilized to suppress oxygen levels. Water pressure is in the range of 2000 psi with temperature ranging from 300° C. to 380° C. dependant upon the operating state of the reactor.

Corrosion in PWR cladding is uniform and related to precipitate size in the Zircaloy cladding. Small precipitates have been found to actually accelerate the uniform corrosion phenomena. Consequently, relative large precipitate sizes are preferred in the PWR zirconium cladding.

In the radiation environment within the PWR, the precipitates dissolve and become smaller with exposure. To avoid accelerated uniform corrosion buildup, PWR cladding uniformly starts with large precipitate sizes—0.2 microns and above—to slow the formation of small size precipitates and the more rapid uniform corrosion that occurs with the small size precipitates.

In a BWR environment, water does boil. The oxygen level is relatively high, being about 200 ppb. Hydrogen may be injected for the stability of structural parts of the reactor, is effectively stripped off as a part of the boiling, and is resident in the water moderator in the range of 20 ppb. Water pressure is in the range of 1000 psi with temperature at 288° C. being essentially a function of pressure and for the most part constant all operating rates of the reactor.

Corrosion in a BWR occurs in nodular or pustule formats on the zirconium cladding. Uniform corrosion is also present—but in the usual case not to a significant degree. Further, mineral and particle deposition occurs on the water exposed surface of the cladding. The combination of the corrosion and depositions can become fairly thick on the water exposed portions of the cladding.

Nodular or pustule corrosion is not inherently bad. However, where fuel in the reactor has longer life—such as time within the reactor exceeding 40 megawatt days per ton, nodular or pustule corrosion concentrates. Where such nodular or pustule corrosion becomes concentrated and acts in conjunction with other particles—such as copper ions—localized penetration of the cladding wall can occur.

Small precipitates have been found to actually suppress nodule and pustule formation. Consequently, it is desired to have small precipitates—below 0.1 microns—to inhibit formation of nodules or pustules. It is known in the prior art to externally treat the outer water exposed surface of cladding with heating from a coil to produce a fine precipitate exterior surface. See Eddens et al. U.S. Pat. No. 4,576,654.

In the radiation environment within the BWR, the precipitates dissolve and become smaller with radiation exposure. Nodular corrosion is inhibited by the small precipitates and by the alloying elements put in solution by the dissolution process.

Anneals of zirconium alloys have been used and can be summarized in terms of temperature ranges. Starting at low temperatures, anneals above 480° C. effect stress relief, usually after working of the metal to achieve around 70% reduction in area. Anneals at about 576° C. not only effect stress relief but also commence recrystallization of the metal. In such anneals, maximum ductility of the material is achieved. Finally, anneals substantially above 576° C. effect crystal growth—generally softening the metal.

In the prior art, the heat treatment for PWR cladding has included high temperature anneals with slow quenches (less than 5°/second) to preserve large precipitate sizes. Conversely, the heat treatment for BWR cladding has included low temperature anneals with fast quenches (greater than 5°/second) to produce small precipitate sizes.

The corrosion resistance of Zircaloy cladding has been improved by forming small, uniformly distributed precipitate particles in the Zircaloy metal matrix. Some portion of the iron, chrome, and nickel components in the Zircaloy matrix form insoluble crystalline precipitates having chemical compositions distinct from the matrix. The precipitates are generally represented by the chemical formulas $Zr(Fe,Cr)_2$ and $Zr_2(Fe,Ni)$. Typically the precipitates used in the more corrosion resistant alloys have an average diameter of less than about 0.1 microns.

Corrosion and cracking can both damage cladding, but they are fundamentally different phenomena. Cracking is a mechanical breaking or splitting of the cladding wall, while corrosion is an electrochemical conversion of the cladding metal into an oxide or other non-metallic compound. Cracks may be initiated by a variety of causes including mechanical stresses as well as corrosion. Once a crack is initiated, it may pose little problem, so long as it remains confined to a small area. However, if the crack propagates, the cladding can be breached and the fission material eventually contacts the coolant or moderator. Ultimately, this can lead to an expensive reactor outage.

The mechanical initiation of cracks can be attributed to various stresses in a conventional reactor. Cracks can start when debris such as wires or metallic shavings or particles find their way into reactor water that flows within the fuel bundles between the fuel rods. The debris may lodge at a fuel rod spacer adjacent the cladding wall. As a result, the debris vibrates or frets against the cladding wall under the influence of the passing steam/water mixture. Such vibration continues until a crack begins.

Corrosion can be the source of initial crack propagation. Moreover, manufacturing defects can be the points of crack origin. Still further, crack propagation can start on the inside of the fuel rods in the corrosive high pressure environment present during in service reactor life.

Regarding cracking in the interior of the sealed cladding tube, brittle splitting of such cladding may occur due to the combined interactions between the nuclear fuel, the cladding, and the fission products produced during the nuclear reaction. It has been found that this undesirable performance is due to localized mechanical stresses on the fuel cladding resulting from differential expansion and friction between the fuel and the cladding. These localized stresses and strain in the presence of specific fission products, such as iodine and cadmium, are capable of producing cladding failures by phenomena known as stress corrosion cracking and liquid metal embrittlement. Other phenomena such as local hydriding of the cladding and the presence of oxygen, nitrogen, carbon monoxide, and carbon dioxide can assist cladding failure and lead to rod cracking.

U.S. Pat. Nos. 4,200,492 and 4,372,817 to Armijo et al as well as Adamson U.S. Pat. No. 4,894,203 suggest solutions to preventing crack initiation by including a barrier on the inside of the cladding. Cladding containing introduce barrier are sometimes referred to as "composite" cladding or cladding having two distinct metallurgical layers.

Although it is highly desirable to prevent crack initiation, in the event a crack forms, its propagation is to be avoided.

There exists a need, especially for a BWR environment, for cladding which is resistant to axial crack propagation. There also exists a need for cladding which, in combination, is resistant to axial crack propagation, crack initiation and corrosion.

SUMMARY OF THE INVENTION

The present invention, in one embodiment, is a zirconium-containing alloy cladding having an outer region comprising fine precipitates and an inner region comprising coarse precipitates. The coarse precipitates impart resistance to propagation of cracks (especially in the axial direction) and the fine precipitates impart resistance to nodular corrosion in nuclear reactors. Further, resistance to fuel rod container damage caused by the pellet-fuel rod interaction can be achieved by utilizing a zirconium or dilute zirconium-alloy liner on the tubing inside surface.

Because nodular corrosion is most problematic on the outer surfaces of typical zirconium alloy tubing in boiling water reactors (as well as many other applications), and in the one embodiment, the fine precipitates are formed only on the outer regions of the tubing. The bulk of the tube contains coarse precipitates to provide improved resistance to crack propagation. The transition between the fine precipitate outer region and the coarse precipitate inner region will exist as a relatively sharp boundary.

Further details and embodiments of the invention are provided in the following discussion and associated drawings.

DESCRIPTION OF THE SPECIFIC EMBODIMENTS

I. THE TUBING STRUCTURE

As used herein, the term "section" refers to a piece of metal having various uses and shapes. The term "tubing" refers to a metal tube having various uses, and the term "fuel rod container" or simply "container" refers to tubing used in fuel rods to enclose fuel pellets. Sometimes the fuel rod container is referred to as "cladding".

Figure 1:
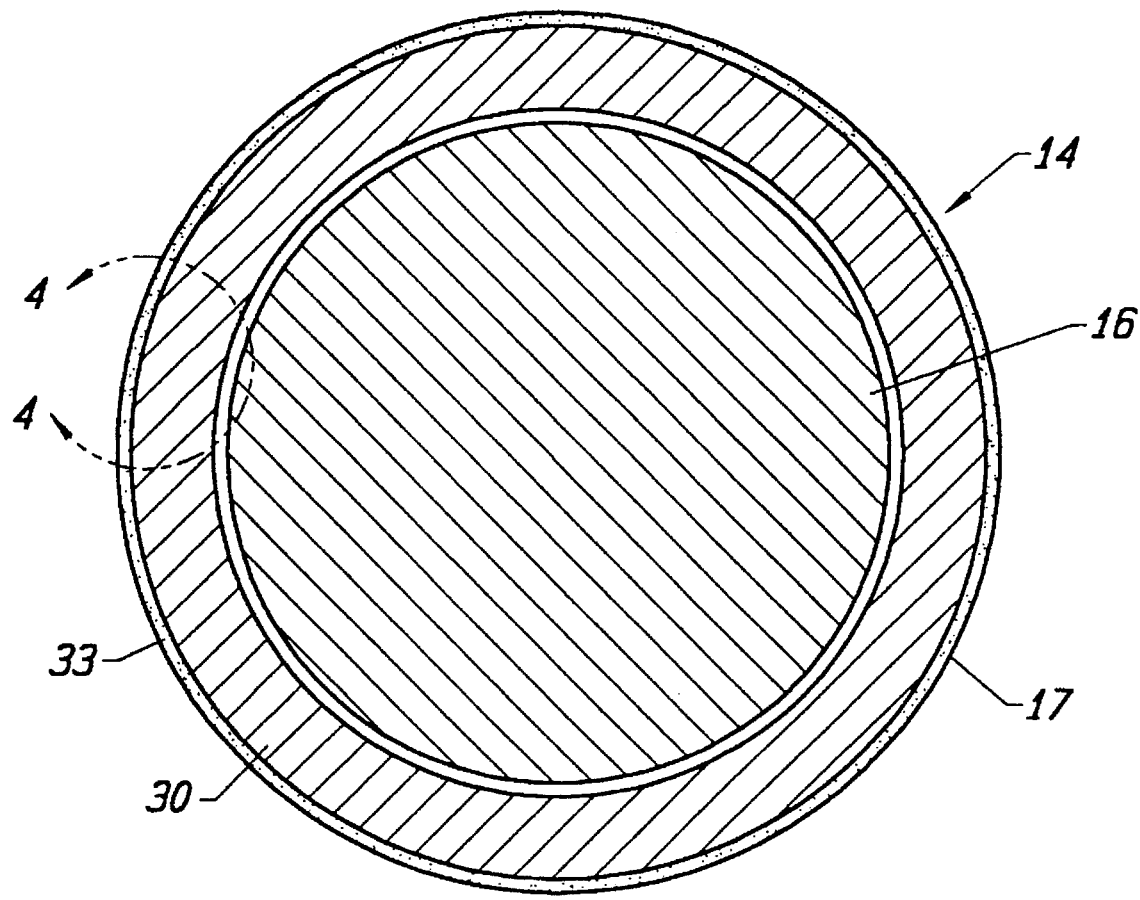
FIG. 1 is cross-sectional view of a preferred fuel rod of the present invention.

Referring to FIG. 1, a fuel element 14 (commonly referred to as a fuel rod) includes a fuel rod container 17 surrounding a fuel material core 16. The fuel element 14 is designed to provide excellent thermal contact between the fuel rod container 17 and the fuel material core 16, a minimum of parasitic neutron absorption, and resistance to bowing and vibration which is occasionally caused by flow of coolant at high velocity. The fuel material core is typically a plurality of fuel pellets of fissionable and/or fertile material. The fuel core may have various shapes, such as cylindrical pellets, spheres, or small particles. Various nuclear fuels may be used, including uranium compounds, thorium compounds and mixtures thereof. A preferred fuel is uranium dioxide or a mixture comprising uranium dioxide and plutonium dioxide.

The fuel rod container 17 of this invention has an inner region 30 containing coarse precipitates and an outer region 33 containing fine precipitates. Both the inner and outer regions of fuel rod container 17 are preferably comprised of a zirconium alloy such as Zircaloy-2 or Zircaloy-4. Zircaloy-2 has on a weight basis about 1.5 percent tin; 0.12 percent iron; 0.09 percent chromium and 0.05 percent nickel. Zircaloy-4 has essentially no nickel and about 0.2% iron but is otherwise substantially similar to Zircaloy-2. "Zirlo"—a zirconium based alloy containing about 1% tin, about 1% niobium, and less than about 0.2% iron—is another alloy that may be used with this invention. Still other alloys that may be used with present invention include at least about 98% zirconium, between about 0.06 and 0.25% iron, between about 0.03 and 0.1% nickel, and between about 0.8 and 1.7% tin (all percents by weight). Other additives may include niobium, bismuth, molybdenum, as well as various other elements used in the art. Most generally, any zirconium alloy that forms intermetallics may be employed.

Figure 2:
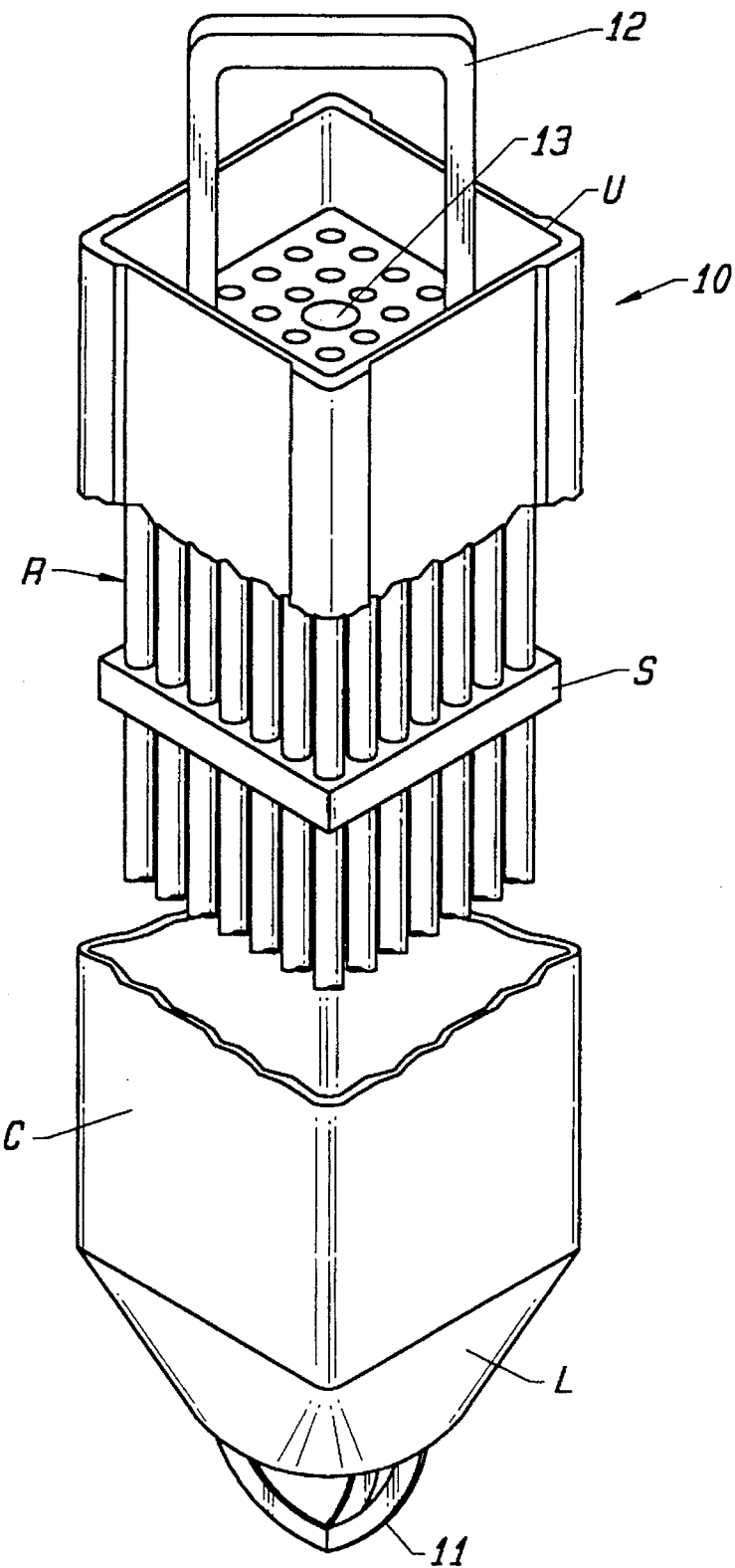
FIG. 2 is a partial cutaway perspective view of a nuclear fuel bundle containing nuclear fuel rod.

FIG. 2 shows a cutaway sectional view of a nuclear fuel bundle or assembly 10 which is a discrete unit of fuel containing many individual sealed fuel elements or rods R. The fuel assembly consists of a flow channel C provided at its upper end with an upper lifting bale 12 and at its lower end with a nose piece L and lower lifting bale 11. The upper end of channel C is open at 13 and the lower end of the nose piece is provided with coolant flow openings. The array of fuel elements or rods R is enclosed in channel C and supported therein by means of upper tie plate U and lower tie plate (not shown). Certain of the fuel rods serving to "tie" the tie plates together—thus frequently being called "tie rods" (not shown). In addition, one or more spacers S may be disposed within the flow channel to hold the fuel elements in alignment with one another and the flow channel. During the in service life of the fuel bundle, the liquid coolant ordinarily enters through the openings in the lower end of the nose piece, passes upwardly around fuel elements R, and discharges at upper outlet 13 in partially vaporized condition.

Figure 3:
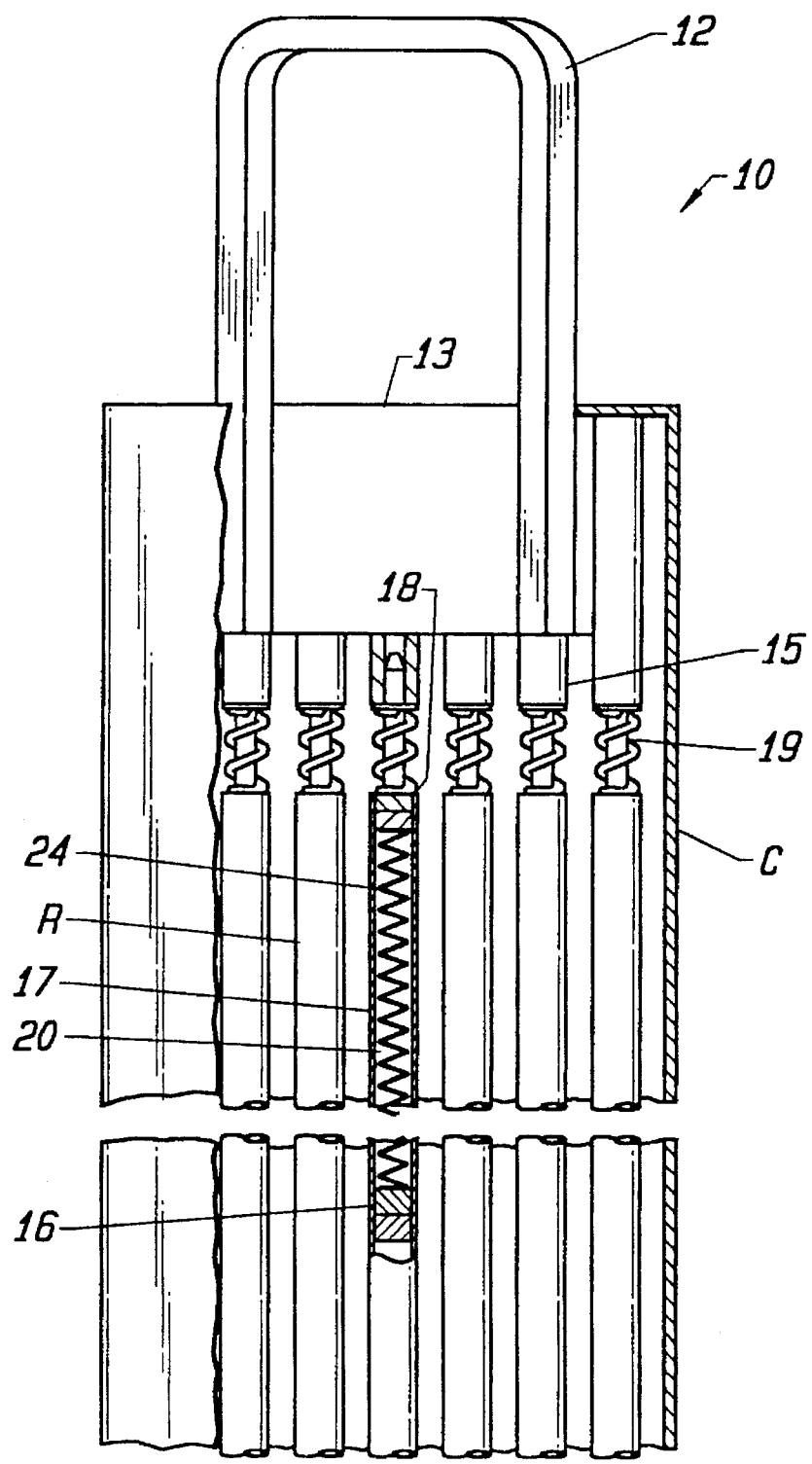
FIG. 3 is a partial cutaway sectional view of a nuclear fuel bundle showing the interior of a fuel rod.

Referring now to FIG. 3, the fuel elements or rods R are sealed at their ends by end plugs 18 welded to the fuel rod container 17, which may include studs 19 to facilitate the mounting of the fuel element in the fuel assembly. A void space or plenum 20 is provided at one end of the element to permit longitudinal expansion of the fuel material 16 and accumulation of gases released by the fuel material. A getter (not shown) is typically employed to remove various deleterious gases and other products of the fission reaction. A nuclear fuel material retainer 24 in the form of a helical member is positioned within space 20 to provide restraint against axial movement of the pellet column during handling and transportation of the fuel element.

Figure 4:
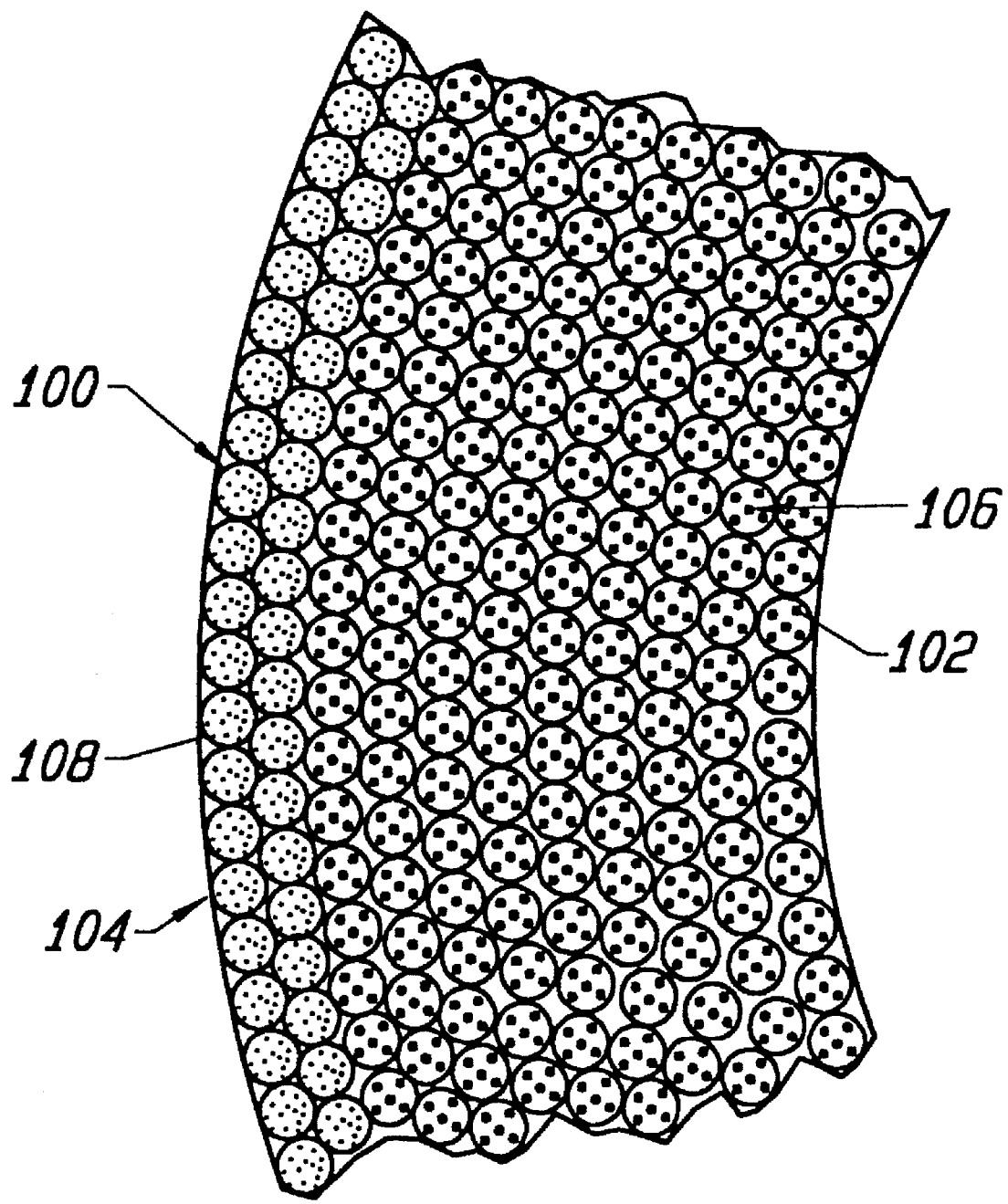
FIG. 4 is a schematic diagram showing regions of fine and coarse precipitates in tubing produced according to the present invention.

FIG. 4 depicts the microstructure of a tube wall 104 according to this invention. As shown in the outer region of the tube wall, the zirconium alloy exists as grains 100. In the inner region of the tube wall, the alloy exists as grains 106. Generally, the grains in the inner and outer regions will have roughly the same size. The microstructure of the grains, however, is different in the two regions. As shown, the outer region grains contain dense collections of fine precipitates 108, while the inner region grains contain less dense collections of coarse precipitates 102. In some embodiments, the inner surface of tube wall 104 will contain a zirconium liner or barrier.

Zircaloy regions containing fine precipitates are more resistant to nodular corrosion than regions containing coarse precipitates. In the present invention, the precipitate structure is altered such that at the outer surface of the tubing wall which is typically exposed to the corrosive boiling water environment, the "fine" precipitate is present while the more "coarse" precipitate is present on the inner surface and throughout the bulk of the tubing wall. The coarse precipitates are believed to impart resistance to crack propagation, especially along the axial direction in a tube.

Preferably, the fine precipitates employed in this invention have an average diameter of between about 0.01 and 0.15 microns, and more preferably between about 0.02 and 0.06 microns. Most preferably, the average diameter of the fine precipitates is about 0.04 micron. Preferably, the coarse precipitates have an average diameter of between about 0.15 and 2 microns, and more preferably between about 0.2 and 1 microns. The above precipitate diameters are easily determined by standard transmission electron microscopy (TEM and STEM) known in the art. It is recognized that precipitates may be distributed throughout the Zircaloy matrix uniformly or as a two dimensional array. In this invention, the fine precipitates in the outer region may be distributed in either manner. The coarse precipitates, in contrast, generally will be distributed uniformly only.

Although corrosion is normally most pronounced at the tubing surfaces, crack initiation and crack propagation occur throughout the entire tubing wall. Thus, the tubing of this invention preferably will have coarse precipitates present throughout the bulk of the tubing, while having fine precipitates present only near the outer surface of the tubing. In preferred embodiments, the outer region containing the "fine" precipitate will span between about 5 and 20% of the wall thickness, while the inner or bulk region containing the coarse precipitate will span between about 80 and 95% of the wall thickness. In more preferred embodiments, the outer region will span between about 5 and 15%, and most preferably, about 10% of the wall thickness. Thus, in typical tubing having a wall thickness of 30 mils, the outer region will preferably occupy about 3 mils.

While not wishing to be bound by the following theory, it is believed that course precipitates impart resistance to crack propagation by virtue of their larger size as well as the effect they have on the local concentrations of iron and nickel at the precipitate/matrix interface. With respect to Zircaloy-2, although the ratio zirconium, nickel, iron, and chrome remains fixed in the precipitates, it can vary in the Zircaloy matrix, especially near the precipitate/matrix interface.

As the precipitate size decreases, less of the iron and nickel remains in the insoluble precipitates. Thus, Zircaloys having fine precipitates also tend to have increased concentrations, albeit relatively low concentrations, of iron and nickel in the matrix phase near the precipitates. These two effects (small precipitate size and increased solute concentration) are believed to contribute to reduced resistance to crack propagation.

Low solute concentrations in the Zircaloy matrix tend to impart increased ductility. Thus, as a crack point encounters a precipitate/matrix interface, it is believed that it will propagate slower (or even stop) in regions of lower solute concentration because these areas are more ductile.

The precipitate characteristics discussed thus far refer to the precipitates in the tubing immediately after formation, but before installation in a reactor. It is well known that during reactor service neutron irradiation changes the precipitate characteristics. These changes include (1) amorphization of the originally crystalline $Zr(Fe,Cr)_2$ precipitates; (2) transfer of iron from the $Zr(Fe,Cr)_2$ precipitate to the Zircaloy matrix as solute; (3) transfer of nickel from the $Zr_2(Fe,Ni)$ precipitates (in Zircaloy-2) to the Zircaloy matrix as solute; and (4) decrease in precipitate size. In some cases, so much material is driven from the precipitates that the surrounding Zircaloy matrix becomes locally supersaturated with the iron and nickel. All of these changes are in the direction of improving nodular corrosion resistance but decreasing crack propagation resistance. The rate of these changes is a function of the neutron fluence (time in the reactor) and the original precipitate size. The changes are more rapid for small precipitates than for large precipitates. Therefore by maximizing the number of large precipitates in the bulk of the Zircaloy tubing, the degradation of the tubing (in terms of resistance to crack propagation) due to neutron fluence is improved.

II. TUBING CONTAINING BARRIER LAYERS

Figure 5:
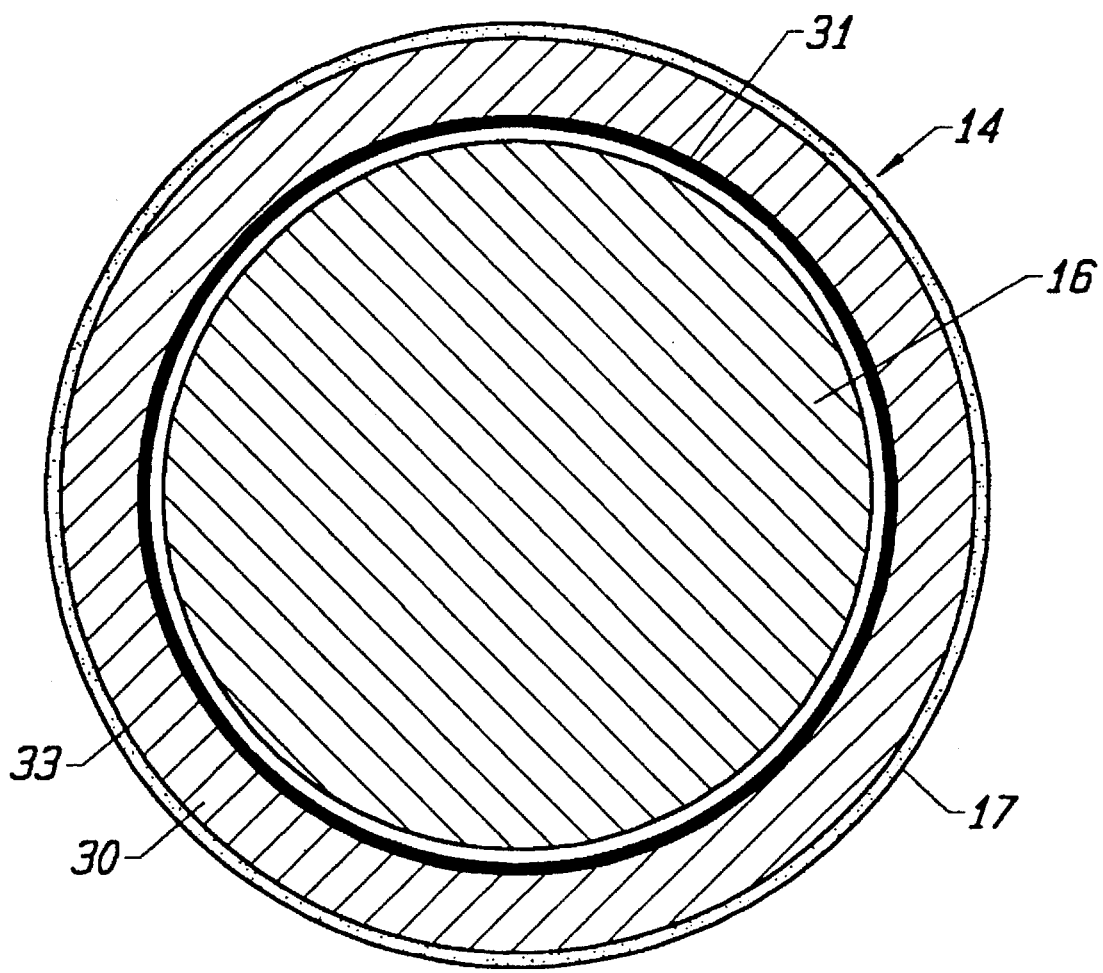
FIG. 5 is a cross-sectional view of a fuel rod showing cladding containing a barrier layer.

In some preferred embodiments, barrier layers having low neutron absorption are formed on the tubing inner surfaces to resist tubing degradation caused by interaction with the nuclear fuel. It is known that the fuel rod containers can be split or otherwise degraded due to interactions between the nuclear fuel, the fuel rod container, and the fission products of the fuel. The barrier layer is typically a highly pure zirconium (such as crystal bar zirconium) or moderately pure zirconium (such as sponge zirconium) sheath metallurgically bonded to the inner surface of the tubing. See U.S. Pat. Nos. 4,200,492 and 4,372,817 to Armijo and Coffin, U.S. Pat. No. 4,610,842 to Vannesjo, and U.S. Pat. No. 4,894,203 to Adamson, each of which is incorporated herein by reference for all purposes. Cladding containing such barrier layer is shown in FIG. 5. In addition to the various elements presented in the embodiment of FIG. 1, the fuel rod container 17 of FIG. 5 includes a barrier layer 31 bonded to the inner surface of inner region 30. A typical barrier layer (which will form a third component of the structures of this invention) will form about 1 to 30 percent, and more preferably about 5–15%, of the total tubing thickness.

The barrier layer should be affixed to the remainder of the tubing by a strong bond. There should be sufficient diffusion between the materials of the tube and the barrier to form a bond, but no diffusion to any extent away from the area of the bond. The barrier zirconium is of the order preferably about 1 to 30 percent, and more preferably 5 to 15 percent of the total thickness of the tubing. In a particularly preferred embodiment, a thickness of 10 percent of the tubing bonded to the alloy tube of a zirconium alloy provides good stress reduction and a barrier effect sufficient to prevent failures in the tubing.

III. MANUFACTURE OF THE TUBING

The size of the precipitate can be controlled by various manufacturing processes. Initially, the precipitate size is governed essentially by the cooling or quenching rate from the beta phase. The beta phase refers to the body-centered cubic crystal lattice structure of crystalline zirconium and Zircaloy that stable at higher temperatures (i.e. forms above about 960° C. for Zircaloy-2). A different phase, the alpha phase, is a close-packed hexagonal crystal lattice structure of zirconium and Zircaloy that is stable at lower temperatures. Between about 825° C. and 960° C., the alpha and beta phases coexist in Zircaloys. Rapid quenching rates from the beta phase (e.g. faster than about 50° C. per second) give smaller precipitates, while slower cooling rates give larger precipitates. The initial precipitate sizes (obtained by quenching from the beta phase) can be altered somewhat by later heat treatments such as annealing at a high temperature (e.g. greater than about 621° C.). This allows some of the nickel, iron and chrome components of the Zircaloy matrix phase and the smaller precipitates to diffuse to larger precipitates, causing the precipitates to coarsen. A guideline widely applicable to various processes is provided by the "accumulated normalized annealing time" defined in F. Garzarolli, et al., "Progress in the Knowledge of Nodular Corrosion", *Zirconium in the Nuclear Industry*, ASTM STP939, pp. 417–430 (1987), which is incorporated herein by reference for all purposes. Preferably, to ensure sufficiently coarse precipitates, the accumulated normalized annealing time should be greater than about $10^{-17}$ hours.

To obtain the nonuniform precipitate distribution of the present invention in which fine precipitates are confined to the outer regions of the tubing, the outer and inner regions of the tubing have to be maintained at different temperatures during at least one process step. This is conveniently accomplished by known induction heat treatment procedures such as those described in U.S. Pat. No. 4,576,654. Generally, the tubing is heated in an induction coil while flowing cooling water through the center of the tube. This raises the temperature of the outer region sufficiently to transform it to the beta phase, while holding the temperature of the inner region to a lower level, thus preserving the coarse precipitate structure. The tube is then rapidly quenched to produce small precipitates in the outer region only.

Regarding the cooling of the tube, any fluid which is generally inert with respect to the zirconium alloy or barrier material can be used. For example, a gas coolant, water, or even steam can be used in such a process.

Of course, by using such techniques a metallurgical gradient or transition region will be present between the outer fine precipitate region of the tubing and the bulk coarse precipitate region. In this transition region, the precipitate size will vary between the desired fine and coarse sizes. In general, it will be a relatively sharp boundary. As used herein, the transition region is considered to be part of the outer region. Typically, it will occupy no more than about 25% of the outer region, but this is by no means a required value. In some cases, the transition region will occupy a much as 5 to 10% of the entire tube wall.

To obtain the final tubing of the necessary dimensions, various other manufacturing steps such as cold-working, extruding, heat treating, and annealing may be employed. The equipment and operating conditions necessary to carry out these various steps will be readily apparent to those of skill in the art, and are described in U.S. patent application Ser. No. 08/052,791 entitled METHOD OF FABRICATING ZIRCALOY TUBING HAVING HIGH RESISTANCE TO CRACK PROPAGATION of the inventors herein which is filed Apr. 23, 1993, the same day as the instant application, is assigned to the assignee hereof, and is incorporated herein by reference for all purposes.

In a preferred embodiment, a billet of zirconium alloy is beta quenched from 1000° C. to about 700° C. by immersion in a tank of water. Next, the tube is extruded with the tube temperature being at about 570° C. by putting the tube through a set of tapered dies under high pressure. The extruded product is referred to as a "tubeshell" which is available in specified dimensions from various vendors such as Teledyne Wahchang (Albany, Oreg. USA), Western Zirconium (A Westinghouse company of Ogden, Utah), and Cezus (France).

Next, a first pass cold work to 70% is performed as in the known processes followed by an anneal at a relatively high temperature (e.g. 650° C. for four hours). At this point, a heat treatment is performed to regain the smaller precipitates on the outside of the tube. This treatment is performed at 1045° C. (in the pure beta phase). An induction coil rapidly heats the outer 15% of the tube to the desired temperature and then shuts off while water is flowing through the tube interior. This allows the tube to rapidly cool (sometimes within a matter of 2 seconds). The penetration of the induction coil energy can be tuned by adjusting the induction coil frequency, the induction coil energy, the speed at which the tube moves through the induction coil, and the water temperature (flow rate). One of skill in the art will appreciate how to adjust these conditions to achieve the type of heat treatment that will form small precipitates at the outer 15% of the tube. Further details can be found in U.S. Pat. No. 4,576,654 to Eddens. The resulting tube will have good nodular corrosion resistance while retaining coarse precipitates in the inner regions.

Next, a second pass cold work to 70% is performed followed by annealing at 650° C. for 2 hours. A third pass cold work and a recrystallization or stress release anneal are performed under the same conditions as the known processes. At this point the tubing is suitable (with only minor modifications and testing) for use in a fuel rod.

If the tubing of this invention is to contain a barrier layer, the fabrication process will have at least one additional step. Details of such a step are known in the art and are provided in, for example, U.S. Pat. No. 4,894,203. Usually, the barrier layer is bonded to the tubing as liner during an extrusion step. Other steps in the process are performed as described above.

IV. CONCLUSION

Although the foregoing invention has been described in some detail for purposes of clarity of understanding, it will be apparent that certain changes and modifications may be practiced within the scope of the appended claims. For instance, although the specification has described preferred zirconium alloy tubes, other shapes may be used as well. For example, plates and metal sections of other shapes may also be used. The Zircaloys described above are examples of alloys that can advantageously be used as tubing in the present invention. Some other zirconium-based alloys as well as certain titanium-based alloys and other metal alloys having similar structures can in many instances also employ the precipitate microstructure of this invention to resist corrosion and crack propagation.

I prefer the use of this invention with cladding in the reactor. The reader will understand that the metallurgy herein can be used in other reactor parts. For example, the Zirconium alloy composition here taught may be used with water rods, spacers, channels and other Zirconium alloy structures and their equivalent within the reactor.

What is claimed is:

1. A zirconium alloy cladding tube with a metallurgical gradient, said cladding tube comprising a corrosion resistant outer circumferential tube region and a crack resistant interior circumferential tube region with the metallurgical gradient disposed there between, the outer circumferential tube region comprising relatively fine and more densely distributed precipitates and an inner circumferential tube region comprising relatively coarser and less densely distributed precipitates produced by an anneal at a temperature of at least about 700° C. for between about 1 and 100 hours wherein the coarser precipitates have an average diameter of at least about 0.15 microns.

2. The zirconium alloy cladding tube of claim 1 wherein the anneal is conducted at between about 700° C. and 750° C. for between about 1 and 100 hours.

3. The zirconium alloy cladding tube of claim 1 wherein the interior circumferential tube region occupies between about 80 and 95% of the tube cross-section.

4. The zirconium alloy cladding tube of claim 3 wherein the interior circumferential tube region occupies about 90% of the tube cross-section.

5. The zirconium alloy cladding tube of claim 1 further comprising a barrier layer.

6. The zirconium alloy cladding tube of claim 1 wherein the coarser precipitates have an average diameter of between about 0.15 and 2 microns.

7. The zirconium alloy cladding tube of claim 1 wherein the fine precipitates have an average diameter of between about 0.01 and 0.15 microns.

8. The zirconium alloy cladding tube of claim 6 wherein the coarser precipitates have an average diameter of between about 0.2 and 1 microns.

9. The zirconium alloy cladding tube of claim 7 wherein the fine precipitates have an average diameter of between about 0.02 and 0.06 microns.

10. The zirconium alloy cladding tube of claim 9 wherein the fine precipitates in the outer surface region have an average diameter of about 0.04 microns.

11. The zirconium alloy cladding tube of claim 1 wherein the zirconium alloy comprises at least about 98% zirconium by weight, between about 0.06 and 0.25% iron by weight, between about 0.03 and 0.1% nickel by weight, and between about 0.8 and 1.7% tin by weight.

12. The zirconium alloy cladding tube of claim 11 wherein the zirconium alloy is Zircaloy-2.

13. The zirconium alloy cladding tube of claim 1 wherein the zirconium alloy is Zircaloy-4.

14. The zirconium alloy cladding tube of claim 1 wherein the zirconium alloy tubing comprises at least about 98% zirconium by weight, about 1% tin by weight, about 1% niobium by weight, and less than about 0.2% iron by weight.

15. A zirconium alloy cladding tube with a metallurgical gradient, said cladding tube comprising a corrosion resistant outer circumferential tube region and a crack resistant interior circumferential tube region with the metallurgical gradient disposed there between, the outer circumferential tube region comprising relatively fine and more densely distributed precipitates and an inner circumferential tube region comprising relatively coarser and less densely distributed precipitates produced by one or more anneals that together have an accumulated normalized annealing time of at least $10^{-17}$ hours, wherein the coarser precipitates have an average diameter of at least about 0.15 microns.

16. The zirconium alloy cladding tube of claim 15 wherein the accumulated normalized annealing time is at least about $5\times10^{-17}$ hours.

17. The zirconium alloy cladding tube of claim 15 wherein the interior circumferential tube region occupies between about 80 and 95% of the tube cross-section.

18. The zirconium alloy cladding tube of claim 17 wherein the interior circumferential tube region occupies about 90% of the tube cross-section.

19. The zirconium alloy cladding tube of claim 15 further comprising a barrier layer.

20. The zirconium alloy cladding tube of claim 15 wherein the coarser precipitates have an average diameter of between about 0.15 and 2 microns.

21. The zirconium alloy cladding tube of claim 15 wherein the fine precipitates have an average diameter of between about 0.01 and 0.15 microns.

22. The zirconium alloy cladding tube of claim 20 wherein the coarser precipitates have an average diameter of between about 0.2 and 1 microns.

23. The zirconium alloy cladding tube of claim 21 wherein the fine precipitates have an average diameter of between about 0.02 and 0.06 microns.

24. The zirconium alloy cladding tube of claim 23 wherein the fine precipitates in the outer surface tube region have an average diameter of about 0.04 microns.

25. The zirconium alloy cladding tube of claim 15 wherein the zirconium alloy comprises at least about 98% zirconium by weight, between about 0.06 and 0.25% iron by weight, between about 0.03 and 0.1% nickel by weight, and between about 0.8 and 1.7% tin by weight.

26. The zirconium alloy cladding tube of claim 25 wherein the zirconium alloy is Zircaloy-2.

27. The zirconium alloy cladding tube of claim 15 wherein the zirconium alloy is Zircaloy-4.

28. The zirconium alloy cladding tube of claim 15 wherein the zirconium alloy tubing comprises at least about 98% zirconium by weight, about 1% tin by weight, about 1% niobium by weight, and less than about 0.2% iron by weight.

29. A composite zirconium alloy cladding tube with a metallurgical gradient, comprising (a) a zirconium alloy cladding tube including an inner surface, a corrosion resistant outer circumferential tube region and a crack resistant interior tube region, with the metallurgical gradient disposed between the outer circumferential tube region and the interior tube region the outer circumferential tube region comprising relatively fine and more densely distributed precipitates and an interior tube region containing relatively coarser and less densely distributed precipitates produced by an anneal at a temperature of at least about 700° C. for between about 1 and 100 hours; and (b) a barrier layer metallurgically bonded to the inner surface of the tubing, wherein the coarser precipitates have an average diameter of at least about 0.15 microns.

30. The composite zirconium alloy cladding tube of claim 29 wherein the barrier layer comprises a material selected from the group consisting of zirconium and dilute zirconium alloys.

31. The composite zirconium alloy cladding tube of claim 30 wherein the barrier layer comprises a material selected from the group consisting of crystal bar zirconium and sponge zirconium.

32. A zirconium alloy section with a metallurgical gradient, having a corrosion resistant outer region and a crack resistant interior region with the metallurgical gradient disposed there between wherein the outer region of the section comprises relatively fine and more densely distributed precipitates and the inner region comprises relatively coarser and less densely distributed precipitates produced by an anneal at a temperature of at least about 700° C. for between about 1 and 100 hours, wherein the coarser precipitates have an average diameter of at least about 0.15 microns.

33. The zirconium alloy section of claim 32 wherein the section forms a channel.

34. The zirconium alloy section of claim 32 wherein the section forms a spacer.

35. A zirconium alloy cladding tube having an exterior water moderator exposed portion and an interior fuel exposed portion with a metallic cross-section therebetween comprising:

an inner region adjacent said fuel exposed portion containing a zirconium alloy matrix with coarser precipitates dispersed throughout, having an average diameter of between about 0.15 and 2 microns; and an outer surface region adjacent said exterior water moderator exposed portion containing said zirconium alloy matrix with fine precipitates dispersed throughout, having an average diameter of between 0.01 and 0.15 microns, wherein the coarser precipitates are produced by an anneal at a temperature of at least about 700° C. for between about 1 and 100 hours.

36. The zirconium alloy cladding tube of claim 35 wherein the coarser precipitates have an average diameter of between about 0.2 and 1 microns.

37. The zirconium alloy cladding tube of claim 35 wherein the fine precipitates have an average diameter of between about 0.02 and 0.06 microns.

38. The zirconium alloy cladding tube of claim 37 wherein the fine precipitates in the outer surface region have an average diameter of about 0.04 microns.

39. The zirconium alloy cladding tube of claim 35 wherein said inner region occupies at least about 80% of the alloy cross section.

40. The zirconium alloy cladding tube of claim 35 wherein the zirconium alloy comprises at least about 98% zirconium by weight, between about 0.06 and 0.25% iron by weight, between about 0.03 and 0.1% nickel by weight, and between about 0.8 and 1.7% tin by weight.

41. The zirconium alloy cladding tube of claim 40 wherein the zirconium alloy is Zircaloy-2.

42. The zirconium alloy cladding tube of claim 35 wherein the zirconium alloy is Zircaloy-4.

43. The zirconium alloy cladding tube of claim 35 wherein the zirconium alloy tubing comprises at least about 98% zirconium by weight, about 1% tin by weight, about 1% niobium by weight, and less than about 0.2% iron by weight.

44. The zirconium alloy cladding tube of claim 43 wherein the zirconium alloy is Zirlo.

45. A zirconium alloy cladding tube having inner and outer surfaces with a thickness of alloy there between, the alloy comprising zirconium alloy having metals other than zirconium therein in sufficient quantities to form precipitates dispersed between said inner and outer surfaces, said zirconium alloy tube including the improvements of:

an inner region adjacent said inner surface containing coarser precipitates, having an average diameter of between about 0.15 and 2 microns; and an outer region adjacent said outer surface containing fine precipitates, having an average diameter of between 0.01 and 0.15 microns, wherein a metallurgical gradient is disposed between the inner and outer regions, and wherein the coarser precipitates are produced by an anneal at a temperature of at least about 700° C. for between about 1 and 100 hours.

46. The zirconium alloy cladding tube of claim 45 wherein the inner tube region occupies between about 80 and 95% of the tube cross-section.

47. The zirconium alloy cladding tube of claim 46 wherein the inner tube region occupies about 90% of the tube cross-section.

48. The zirconium alloy cladding tube of claim 45 further comprising a barrier layer.

49. The zirconium alloy cladding tube of claim 45 wherein the coarser precipitates have an average diameter of between about 0.2 and 1 microns.

50. The zirconium alloy cladding tube of claim 45 wherein the fine precipitates have an average diameter of between about 0.02 and 0.06 microns.

51. The zirconium alloy cladding tube of claim 50 wherein the fine precipitates in the outer surface region have an average diameter of about 0.04 microns.

52. The zirconium alloy cladding tube of claim 45 wherein the zirconium alloy comprises at least about 98% zirconium by weight, between about 0.06 and 0.25% iron by weight, between about 0.03 and 0.1% nickel by weight, and between about 0.8 and 1.7% tin by weight.

53. The zirconium alloy cladding tube of claim 52 wherein the zirconium alloy is Zircaloy-2.

54. The zirconium alloy cladding tube of claim 45 wherein the zirconium alloy is Zircaloy-4.

55. The zirconium alloy cladding tube of claim 45 wherein the zirconium alloy tubing comprises at least about 98% zirconium by weight, about 1% tin by weight, about 1% niobium by weight, and less than about 0.2% iron by weight.

56. A fuel element comprising:

a zirconium alloy cladding tube having inner and outer surfaces with a thickness of alloy therebetween, the alloy comprising zirconium alloy having metals other than zirconium therein in sufficient quantities to form precipitates dispersed between said inner and outer surfaces, said zirconium alloy cladding tube including, an inner region adjacent said inner surface containing coarser precipitates, having an average diameter of between about 0.15 and 2 microns;

an outer region adjacent said outer surface containing fine precipitates, having an average diameter of between 0.01 and 0.15 microns;

nuclear fuel material disposed within said tube; and means for sealing the respective ends of said tube with said nuclear material therein, wherein the coarser precipitates are produced by an anneal at a temperature of at least about 700° C. for between about 1 and 100 hours.

57. The fuel element of claim 56 wherein said inner tube region occupies at least about 90% of the tube cross-section.

58. The fuel element of claim 56 wherein the fine precipitates have an average size of about 0.04 microns.

59. The fuel element of claim 56 further comprising a pressurized gas within said nuclear fuel element.

60. The fuel element of claim 56 the tube further comprises a barrier layer made from a zirconium-containing material selected from the group consisting of crystal bar zirconium and sponge zirconium.

61. A nuclear fuel bundle comprising:

a lower tie plate for supporting an upstanding matrix of fuel rods and permitting the entry of water moderator;

an upper tie plate and permitting the exit of water and generated steam moderator;

a plurality of fuel rods, said fuel rods including a zirconium alloy cladding tube having inner and outer surfaces with a thickness of alloy there between, the alloy comprising zirconium alloy having metals other than zirconium therein in sufficient quantities to form precipitates dispersed between said inner and outer surfaces, said zirconium alloy cladding tube including:

an inner region adjacent said inner surface containing coarser precipitates, having an average diameter of between about 0.15 and 2 microns;

an outer region adjacent said outer surface containing fine precipitates, having an average diameter of between 0.01 and 0.15 microns;

nuclear fuel material disposed within said zirconium alloy cladding tube;

means for sealing the respective ends of said tube with said nuclear material therein one or more spacers disposed within said fuel bundle at varying elevations on said fuel bundle, said spacers surrounding and holding said array of fuel elements in designed center to center spacing; and, means for tying said upper and lower tie plates together, wherein the coarser precipitate are produced by an anneal at a temperature of at least about 700° C. for between about 1 and 100 hours.

62. The nuclear fuel bundle of claim 61 further comprising a channel, said channel surrounding said fuel bundle from the vicinity of said lower tie plate to the vicinity of said upper tie plate to define a flow channel between said tie plates around said fuel elements.

63. A zirconium alloy reactor structure with a metallurgical gradient, having a corrosion resistant outer region and a crack resistant interior region with the metallurgical gradient disposed there between wherein the outer region of the structure comprises relatively fine and more densely distributed precipitates and the inner region comprises relatively coarser and less densely distributed precipitates produced by an anneal at a temperature of at least about 700° C. for between about 1 and 100 hours, and wherein the coarser precipitates have an average diameter of at least about 0.15 microns.

64. The zirconium alloy reactor structure of claim 63 wherein the reactor structure is a spacer.

65. The zirconium alloy reactor structure of claim 63 wherein the reactor structure is a channel.

66. A zirconium alloy structure with a metallurgical gradient, having a corrosion resistant outer region and a crack resistant interior region with the metallurgical gradient disposed there between, wherein the outer region of the structure comprises relatively fine and more densely distributed precipitates and the inner region comprises relatively coarser and less densely distributed precipitates produced by one or more anneals that together have an accumulated normalized annealing time of at least $10^{-17}$ hours, wherein the coarser precipitates have an average diameter of at least about 0.15 microns.

67. A zirconium alloy cladding tube with a metallurgical gradient, said cladding tube comprising a corrosion resistant outer circumferential tube region and a crack resistant interior circumferential tube region with the metallurgical gradient disposed there between, the outer circumferential tube region comprising relative finer and more densely distributed precipitates and the inner circumferential tube region comprising relatively coarser and less densely distributed precipitates, the outer and inner circumferential tube regions formed by performing the steps of:

(a) annealing the tube at a temperature of at least about 700° C. for between 1 and 100 hours to form coarse precipitates throughout both the inner and outer tube regions; and (b) heat treating and then quenching the outer tube region to at least the alpha plus beta range to form finer precipitates in the outer tube region, wherein the coarser precipitates have an average diameter of at least about 0.15 microns.

68. The zirconium alloy cladding tube of claim 67 wherein the interior circumferential tube region occupies between about 80 and 95% of the tube cross-section.

69. The zirconium alloy cladding tube of claim 67 further comprising an inner barrier layer.

70. The zirconium alloy cladding tube of claim 67 wherein the coarser precipitates have an average diameter of between about 0.15 and 2 microns.

71. The zirconium alloy cladding tube of claim 67 wherein the fine precipitates have an average diameter of between about 0.01 and 0.15 microns.

72. A zirconium alloy cladding tube with a metallurgical gradient, said cladding tube comprising a corrosion resistant outer circumferential tube region and a crack resistant interior circumferential tube region with the metallurgical gradient disposed there between, the outer circumferential tube region comprising relative finer and more densely distributed precipitates and the inner circumferential tube region comprising relatively coarser and less densely distributed precipitates, the outer and inner circumferential tube regions formed by performing the steps of:

(a) heat treating at temperature of at least about 700° C. for between about 1 and 100 hours and then performing a slow quench on the tube to form coarse precipitates throughout both the inner and outer tube regions; and (b) heat treating and then quenching the outer tube region to at least the alpha plus beta range to form finer precipitates in the outer tube region, wherein the coarser precipitates have an average diameter of at least about 0.15 microns.

73. The zirconium alloy cladding tube of claim 72 wherein the interior circumferential tube region occupies between about 80 and 95% of the tube cross-section.

74. The zirconium alloy cladding tube of claim 72 further comprising a barrier layer.

75. The zirconium alloy cladding tube of claim 72 wherein the coarser precipitates have an average diameter of between about 0.15 and 2 microns.

76. The zirconium alloy cladding tube of claim 72 wherein the fine precipitates have an average diameter of between about 0.01 and 0.15 microns.

\* \* \* \* \*